United States Patent
Shibamori et al.

(10) Patent No.: US 7,162,347 B2
(45) Date of Patent: Jan. 9, 2007

(54) SYSTEM AND METHOD FOR MANAGING CONSTRUCTION MACHINERY

(75) Inventors: Kazuhiro Shibamori, Ibaraki (JP);
Genroku Sugiyama, Ibaraki (JP);
Hiroyuki Adachi, Ibaraki (JP); Koichi Shibata, Ibaraki (JP); Hideki Komatsu, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 283 days.

(21) Appl. No.: 10/492,428

(22) PCT Filed: Jan. 14, 2003

(86) PCT No.: PCT/JP03/00212

§ 371 (c)(1),
(2), (4) Date: Apr. 12, 2004

(87) PCT Pub. No.: WO03/059708

PCT Pub. Date: Jul. 24, 2003

(65) Prior Publication Data

US 2004/0236489 A1 Nov. 25, 2004

(30) Foreign Application Priority Data

Jan. 15, 2002 (JP) .............................. 2002-006382

(51) Int. Cl.
*B60R 25/10* (2006.01)
*E02F 9/20* (2006.01)
*G06F 19/00* (2006.01)
(52) U.S. Cl. ..................... 701/50; 701/213; 340/995.21
(58) Field of Classification Search .................. 701/50, 701/2, 213, 300, 302; 340/995.21, 988, 438
See application file for complete search history.

(56) References Cited

U.S. PATENT DOCUMENTS

| | | | | |
|---|---|---|---|---|
| 5,250,761 A | * | 10/1993 | Koyanagi | 177/141 |
| 5,475,597 A | * | 12/1995 | Buck | 455/456.5 |
| 5,714,946 A | * | 2/1998 | Gottshall et al. | 340/870.16 |
| 5,848,368 A | * | 12/1998 | Allen et al. | 701/50 |
| 6,134,493 A | * | 10/2000 | Kaneko | 701/50 |
| 6,449,884 B1 | * | 9/2002 | Watanabe et al. | 37/348 |
| 6,614,361 B1 | * | 9/2003 | Kinugawa | 340/870.16 |
| 6,643,582 B1 | * | 11/2003 | Adachi et al. | 701/207 |

* cited by examiner

*Primary Examiner*—Tan Q. Nguyen
(74) *Attorney, Agent, or Firm*—Antonelli, Terry, Stout and Kraus, LLP.

(57) ABSTRACT

Construction machine management, permitting operation of a construction machine only under specified conditions and inhibiting its operation in case it is in a state incongruent with preset working conditions. Working conditions for each construction machine are set up by a working conditions setup means, including a geographically divided working area and a working time zone in which a construction machine is allowed to operate in a specified working area. Setup working conditions are stored in a memory means. At the time of starting a construction machine, the status of the construction machine is checked for by a status checkup means which is adapted to check for current position of the construction machine and current time against the working area and working time zone of the setup working conditions. In case a construction machine is found to be in a state incongruent with both of the working area and the working time zone of the preset working conditions, the management inhibits operation of that construction machine.

9 Claims, 6 Drawing Sheets

SYSTEM AND METHOD FOR MANAGING CONSTRUCTION MACHINERY

TECHNICAL FIELD

This invention relates to a construction machine management system and method for controlling operations of construction machines such as hydraulic power shovels or the like, and more particularly to a construction machine management system and method by which working conditions such as geographical working area and working time zone can be set up each construction machine under management surveillance.

TECHNICAL BACKGROUND

For prevention and early detection of construction machine thefts which lately take place at an increasing frequency particularly for construction machines such as hydraulic power shovels, hydraulic cranes, bulldozer and the like, there has been proposed to establish a construction machine management center for surveillance of locations of construction machines, for example, as in Japanese Laid-Open Patent Application 2000-73411. According to this prior art, the position of a construction machine on a working site is measured on the basis of GPS (Global Positioning System) signals, using the resulting position data for judging possibilities of a machine theft. Namely, in this case, a place or an area where a construction machine is normally supposed to be located is set up as a proper working area in a management server of the construction machine management center. Position data of various construction machines under management are periodically reported to the management server. In case a construction machine is found to be located outside a proper working area, it is presumed that a theft has occurred to that machine and a command signal is dispatched from the management side for cutting off power supply to an engine starter motor, stopping the engine of the machine by cutting off fuel supply or taking other suitable measures to prevent construction machine thefts.

By the way, at a working site, except for special cases, normally a construction machine is not put in operation 24 hours a day. Namely, it is usually the case that a construction machine is operated only in a limited time zone of a day and put at rest at night. Throughout the rest time zone at night, a construction machine is stopped on a predetermined place with or without a night guard. Even if a night guard is stationed, it is difficult to keep a machine constantly under strict surveillance. Maybe most of construction machine thefts can be prevented by increasing the number of guards, but from the standpoint of personnel costs it is impractical to increase the number of guards to a sufficient degree.

Constant surveillance of construction machines at respective working sites, including rest periods at night, can be an effective measure for preventing machine thefts or for quickly finding machine thefts. However, since data of locations of respective construction machines have to be acquired via communication satellites, constantly connected surveillance will require vast communication costs. In addition, there will arise another problem that batteries on the respective construction machines are consumed markedly because have to be constantly kept on. Therefore, in a rest period, it is the usual practice to acquire data of construction machine locations at time intervals of one to several hours. If a construction machine theft takes place immediately after acquisition of location data, detection of the machine theft can be delayed for several hours to make it difficult to get the machine back in an early stage.

Normally, a transportation means such as trailer or the like is used for transporting a construction machine like a hydraulic power shovel from one place to another, and the automotive base carrier of the construction machine is put in travel at the time of getting machine onto a transportation means. Similarly, the machine engine has to be started to move the construction machine in the case of a machine theft as well.

DISCLOSURE OF THE INVENTION

In view of the foregoing situations, it is an object of the present invention to provide construction machine management system and method which permits operations of a construction machine only under specified working conditions including conditions of a working time zone in addition to geographic regional conditions to prevent construction machine thefts from happening or to spot and find a stolen construction machine very quickly in case of a machine theft.

According to the present invention, in order to achieve the above-stated objective, there is provided a construction machine management system, managing construction machines in such a way as to permit operations of construction machines only under specified working conditions while inhibiting operations of the construction machines when not in agreement with the specified working conditions, the system comprising: working condition setup means adapted to set up working conditions for each one of the construction machines, the working conditions including a working time zone in addition to a working area with geographical bounds; a memory means for storing the working conditions set up by the working condition setup means; a status checkup means adapted to check for current status of the construction machines against the working area and working time zone of the setup working conditions; and an operation inhibiting means adapted to inhibit operation of the construction machines when in a state incongruent with the setup working conditions with regard to both of the working area and working time zone.

As working conditions of a construction machine, two different kinds of working conditions, a geographical working area and a working time zone in that working time area, are set up beforehand. The working area is a regional area which contains a working site, and its bounds are defined depending upon the nature of a working site, the nature of operations to be performed, the type of the construction machine, an automotive traveling type or a fixed type, and the maximum distance over which the construction machine will be moved during operation. At the time of setting up the working area, it may be defined by latitudes and longitudes or alternatively it may be selected by way of an administrative division such as a state, prefecture, county, city, village or an urban or suburban district.

The working time zone is set up on the basis working hours at a working site, and the management is not necessarily limited to an expected working time zone of a construction machine. Namely, even when the construction machine is not in operation or is at rest, there is little possibility of machine thefts if other construction machines are in operation nearby or if some workers are still at work on the same working site. On the contrary, even in a time zone outside an expected working time zone of a construction machine, there may arise a necessity for putting the machine in operation in connection with a work or activity which is still going on at the same working site. Therefore, exclusion of such machine operations in a safe time zone might give rise to inconvenient situations. For example, a working time zone can be set up on the basis of work starting and ending times at a working site where a construction machine is located, adding an extra allowance time margin of a certain length before and after the work starting and ending time points. Thus, various situations at a working site should be taken into consideration at the time of determining the work starting and ending times for the setup of the working time zone. Depending upon the nature of the work, the working time zone may be extended to 24 hours a day.

In setting up the above-mentioned working conditions, one set of working conditions including one working area and a working time zone in that working area can be set up separately machine by machine, or working conditions involving a plural number of working areas and a working time zone in each one of the working areas can be set up collectively. In the latter case, it becomes unnecessary to set up new working conditions even in case where one construction machine is relocated from one working site to another. In addition, it becomes possible to set up same working conditions for a plural number of construction machines, permitting to complete setup operations in a facilitated and time-saving manner. Accordingly, in a case where a setup format is arranged to permit setup of a plural number of working areas along with working time zones in the respective working areas, it is possible to set up the same working conditions for a plural number of construction machines which are located at different working sites collectively in a very time-saving manner.

In a case where a large number of construction machines are put under management and surveillance of a construction machine management center, a management device such as a management server is set up at the management center. In some cases, communication terminals such as personal computers, which are owned by clients of construction machine management service or by authorized persons who have interests in a construction machine or machines under management, are connected the management center through a network. According to the present invention, preferably the management system is basically configured to include a working conditions setup means, a memory means for storing setup working conditions, a status checkup means, and an operation inhibiting means. In case a number of authorized communication terminals are connected to the management server, the working conditions setup means can be provided on the side of the communication terminals. Further, the working conditions setup means can be provided on the side of construction machines although in this case it is necessary to provide measures for preventing alteration of conditions by a thief.

The working condition memory means and the status checkup means are provided either on the side of a construction machine or on the side of the management center. Since the operation inhibiting means is provided on the side of a construction machine, an operation inhibiting signal can be dispatched thereto more directly if the memory means and the status checkup means are provided also on the side of the construction machine. In case these means are provided on the side of the management center, it becomes necessary to use communication means to transmit an operation inhibiting means to the construction machine. The operation inhibiting means serves to produce and dispatch a command signal for inhibiting operation of the construction machine. In this regard, it is the most direct action to inhibit engine operation upon receipt of an operation inhibiting signal. For inhibiting engine operation, it is the general practice to prevent an engine from getting started despite a engine start-up operation. In case the engine is already in operation, a countermeasure may be taken to stop the engine. Furthermore, in case the construction machine is a hydraulic type, the management system may be arranged to stop operation of a hydraulic actuator which is provided on the construction machine to perform various operations.

As communication means for exchanging data between the management center and each one of the construction machines under the management surveillance, it is desirable to utilize a communication satellite considering that in many cases construction machines are used in remote secluded places in an inferior communication environment. However, it is possible to use other communication means, for example, ground wave communication means, mobile phone communications or the like. The data of current position of a construction machine can be acquired from the GPS satellites mentioned hereinbefore.

Therefore, according to the present invention, operation of a construction machine is permitted only under preset specific working conditions, and inhibited in case the status of the construction machine is found to be incongruent with the preset working conditions. The working conditions, including a geographic working area where a construction machine is supposed to be for operation and a working time zone in that working area, are set up for each construction machine. Every time when a construction machine is started, the status of the machine is checked against the setup working conditions to see whether or not the machine is in a state congruent with setup working conditions. In case both of the working area and working time zone of the setup working conditions are not satisfied, a suitable measure is taken to inhibit start-up or operation of the construction machine.

As another method of construction machine management, for permitting operation of a construction machine only under preset specific conditions and otherwise inhibiting start-up or operation of the construction machine, it is possible to set up a plural number of working areas and working time zones in the respective working areas with regard to one construction machine. In this case, every time the construction machine is started, the status of the machine is checked against the setup working conditions on the basis of current position and present or current time to check whether or not it is in a state congruent with the preset working conditions. Start-up operation of the construction machine is allowed only when the machine is located in one of the setup working areas and in a working time zone which has been set up for that particular working zone.

BEST MODE FOR CARRYING OUT THE INVENTION

Figure 1:
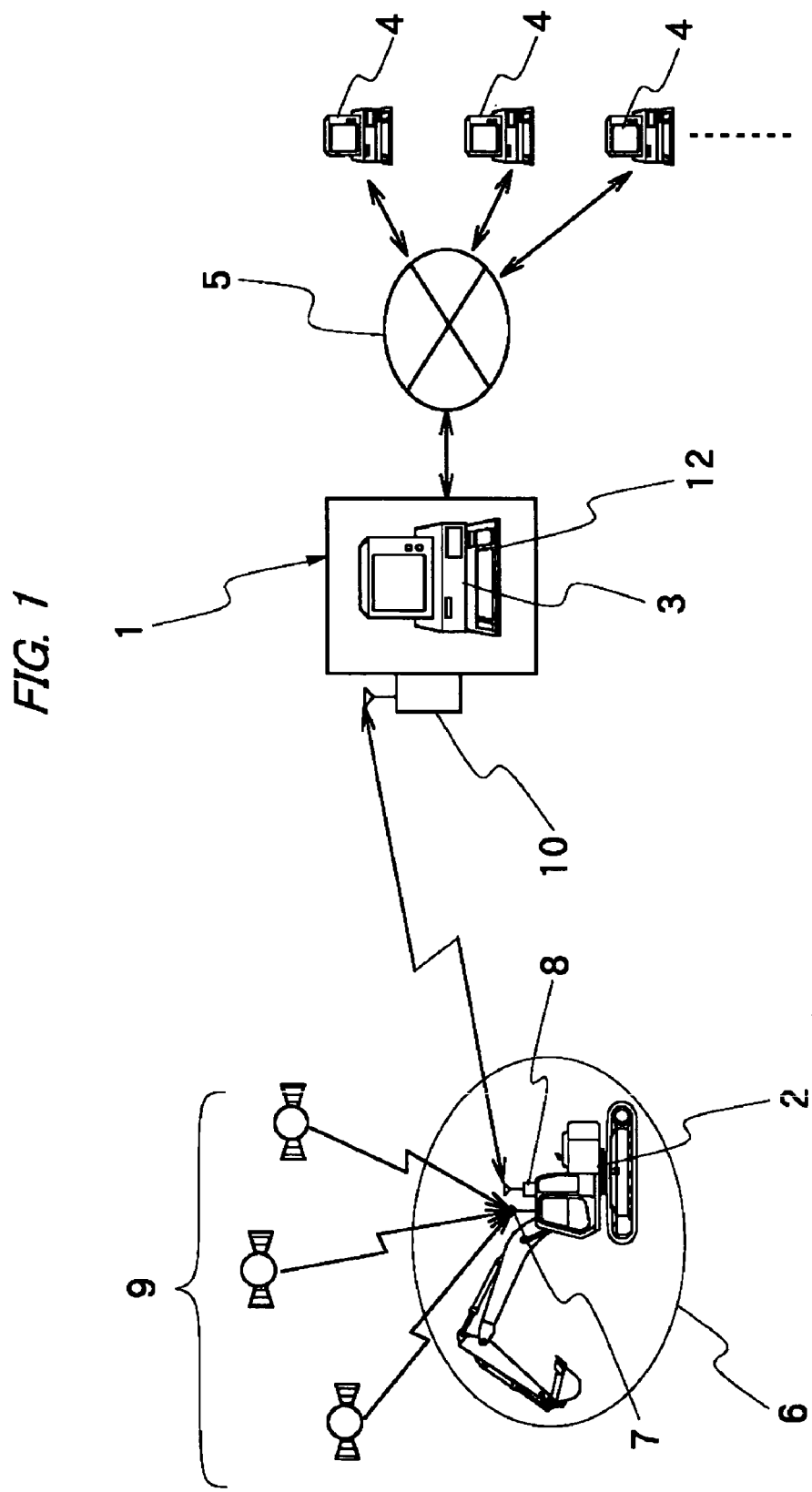
FIG. 1 is a schematic illustration of a construction machine management system according to one embodiment of the present invention.

Hereafter, the present invention is described more particularly by way of its preferred embodiments with reference to the accompanying drawings. Firstly, shown in FIG. 1 is the general configuration of a construction machine management system as a whole. By way of example, the management system in the following description is arranged to manage a plural number of construction machines by a management server at a construction machine management center, and a plural number of authorized communication terminals (e.g., personal computers) are connected to the management server. In this instance, the term "authorized communication terminals" means communication terminals which are authorized of access to the management server by the management center, including, for example, communication terminals installed at various branch offices of one and same business entity which solely or jointly owns the management server, or communication terminals owned by a plural number of construction machine rental contractors which are jointly put under the surveillance service of the management center.

Referring first to FIG. 1, indicated at 1 is a management center, established for management of construction machines 2. A management server 3 is installed at the management center 1, and a plural number of communication terminal devices 4 are connected to the management server 3, for example, through the Internet network 5. The communication terminal devices 4 are provided for use by the users of the construction machines or other persons who have interests in the construction machines, in acquiring data of current status of the respective construction machines. Denoted at 6 is a working site where a construction machine 2 is located for operation. The construction machine 2 is equipped with a GPS antenna 7 and a data communication device 8. The GPS antenna 7 is provided on each construction machine for the purpose of getting its own position data from satellites 9. Further, data are exchanged between the data communication device 8 on the side of the construction machine 2 and a data communication device 10 which is provided on the side of the management server 3. In this instance, the communications between the management server 3 and the communication device 8 of the construction machine 2 are communications of both directions utilizing mobile phone ground waves or a wireless communication satellite.

In the following description, among various construction machine management services which can be provided by the management center 1 in connection with machine operations, machine troubles and accidents, the present invention is described as applied to construction machine theft management. In principles, the machine theft management operates on a system which is arranged to periodically check up the current status of each construction machine, stolen or not stolen, presuming that the machine has been stolen by a theft and sending a command signal to inhibit operation of the machine, for example, to inhibit engine start of the machine in case the machine is found to have been removed from a proper working area without any legitimate procedure. Arrangements can be made to stop operation of a hydraulic actuator in case the stolen machine is a hydraulic drive type. An inhibiting countermeasure is taken by applying a control signal to a corresponding operating part from the controller 11 of the construction machine 2.

Accordingly, for machine theft management, it is necessary to acquire data of current locations of the respective construction machines 2, namely, current position data of the construction machines 2. Position data of this sort can be obtained by measurements based on GPS signals. The method of measuring positions on the basis of GPS signals is well known in the art, so that detailed explanation in this regard is omitted here.

Let alone a construction machine 2 of the type which is fixedly set up at a certain position on a working site 6, an automotive type construction machine 2 which is moved on and across a working site 6 should be regarded as being at a proper location as long as it is in a specified working site 6 or in areas around or immediately bordering on that working site 6, and regarded as having been stolen only when it is absent in the specified working site 6 or bordering areas. Therefore, a proper working area in which an automotive construction machine 2 normally can move around is set up for each working site 6 beforehand. Namely, a proper working area is set up for each construction machine 2 beforehand, and a machine theft is suspected when the machine is moved out of the proper working area without a permission.

By the way, normally construction machines 2 are not put in operation 24 hours a day. Namely, in most cases the construction machines 2 are put at rest at night except civil road construction or repair works which are carried out nighttime, rather avoiding a daytime period when traffic is dense. Further, it is often the case that the same work is started and ended at different times in different regions and in different seasons. There is little possibility of a construction machine 2 in a working time zone when at least a worker is at work at the working site 6. A construction machine theft is most likely to occur in a rest period at night when no one is at the working site 6. As far as a rest period is concerned, there will arise no problems in particular even if operation of a construction machine 2 is totally inhibited. Therefore, a working time zone is set up for each construction machine 2 in relation with its working site and the nature of its work, permitting operation of the machine 2 in a preset working time zone and inhibiting operation at a time point outside the preset working time zone, that is to say, inhibiting operation during a rest period.

In order to carry out machine theft management, it is necessary to provide working conditions setup means, memory means, status checkup means and operation inhibiting means. The working conditions setup means is necessary for setting up working areas and working time zones of the construction machines 2. The memory means is for storing data of the working areas and working time zones set up by the working conditions setup means. The status checkup means functions to check the status of a construction machine, as to whether or not a construction is currently in a preset working area and as to whether or not the construction machine is in a preset working time zone for that working area. In case it is judged by the status checkup means that operation of the construction machine should be inhibited, a command signal is dispatched to inhibit an engine start-up or to stop the engine of the machine.

Figure 2:
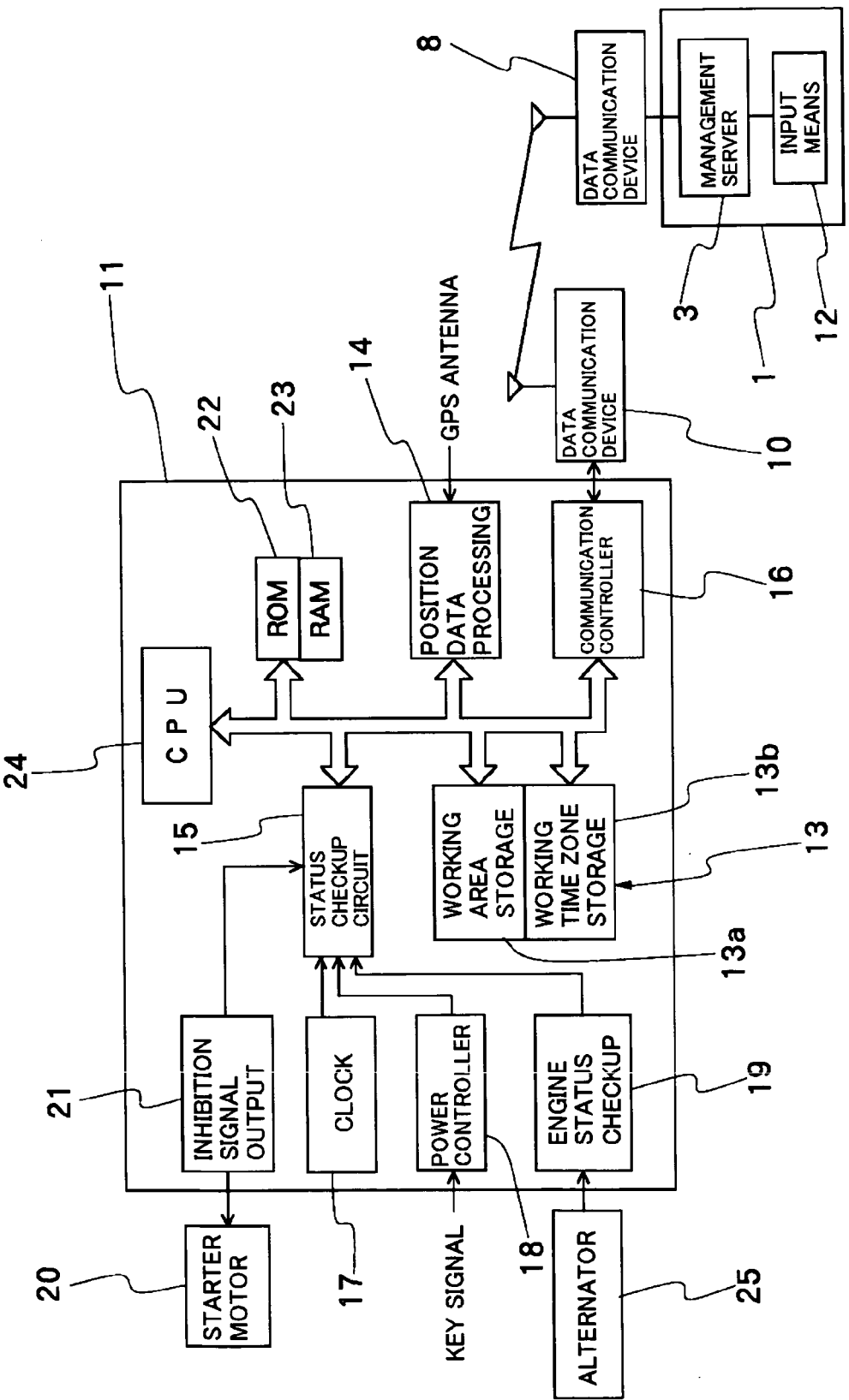
FIG. 2 is a diagram of a circuitry including a construction machine controller and a management server.

Therefore, as shown in FIG. 2, the working conditions setup means is provided on the side of the management server 3. The management server 3 is provided with an input means 12 including a keyboard and a mouse. These input means 12 are used at the time of setting up working conditions. Alternatively, working conditions can be set up from the communication terminal device 4 via the Internet network 5. In the latter case, the communication terminal device 4 constitutes the working conditions setup means. Further, in a case where an input means like a personal computer is connectible to the controller 11 on the side of a construction machine 2, it also can function as a working condition setup means.

The memory means which stores data of setup working conditions is closely related with the status checkup means. In a case where a status checkup operation is carried out on the side of the management server 3, arrangements are made to set up working conditions in the management server 3. In the particular embodiment shown, the controller 11 is arranged to carry out status checkups and therefore the memory means 13 is provided in the controller 11. In this instance, the memory means 13 is constituted by a working conditions storage portion 13a and a working time zone storage portion 13b. Since the working conditions setup means is provided on the side of the management server 3, data of setup working conditions are transmitted to the data communication device 10 of the construction machine 2 through the data communication device 8 of the management server 3. A communication control circuit 16 is provided in the controller 11, and, by this communication control circuit 16, data of setup working area and data of setup working time zone which have been received from the management server 3 are allocated to the working area storage portion 13a and the working time zone storage portion 13b of the memory means 13, respectively.

The controller 11 is provided with a status checkup circuit 15 as the above-mentioned status checkup means. This status checkup circuit 15 is arranged to make judgements as to whether or not a construction machine 2 is located within a preset working area and, make judgements as to whether or not the current status of the construction machine 2 is in agreement with present working conditions when the construction machine 2 is about to be started. In order to carry out status checkup operations, the controller 11 is provided with a position data processing circuit 14 thereby to measure the current position of the construction machine 2 on the basis of GPS signals received from the satellites 9 through the GPS antenna 7, and a clock circuit 17. In this instance, a status checkup operation is carried out basically regularly at predetermined time intervals (regular status checkup operations). Therefore, even when the construction machine 2 is in a rest period, power supply of the controller 11 is turned on at predetermined time intervals by the clock circuit 17 to execute a regular status checkup. Regular status checkup operations alone may be sufficient in some cases. However, in addition to the above-described regular status checkups, it is desirable to make a status check every time when an attempt is made to start the construction machine 2 (a start-up status checkup operation), because a machine is started to get it onto a trailer or other transportation means in most cases of machine thefts. In this connection, the controller 11 is provided with a power supply control circuit 18 which functions to turn on power supply every time on detection of an engine start key signal. Accordingly, an on-start status check is executed every time when a power-on signal is applied to the power supply control circuit 18. Further, the controller 11 is provided with a engine condition checkup circuit 19 to which a power generation signal of an alternator 25 is applied for the purpose of making a judgement as to whether or not the construction machine 2 is currently in operation.

In case the construction machine 2 is found to be located in a preset proper working area and in a preset working time zone as a result of the status checkup operation by the status checkup circuit 15, the status checkup operation is completed without taking any countermeasures. If the construction machine 2 is judged as being located outside a proper working area or outside a preset working time zone by the status checkup operation, an inhibiting signal is dispatched from an operation inhibition signal output circuit 20 thereby to lock the operation of an engine starter motor 20 or to stop the engine of the machine 2. As a consequence, in case the construction machine 2 is judged as being actually moved, it is compulsorily brought to a stop. In case the status of the construction machine 2 is judged as being in the process of staring the engine, an inhibiting signal is dispatched to cancel all of following starting operations. In order to spot a machine theft in an early stage and to take quickly a countermeasure to the machine theft, it is desirable to make arrangements to send a report quickly to the management server in case the construction machine 2 is judge as being located outside a proper preset working area, being put in operation or being started outside a preset working time zone.

ROM 22 in the controller 11 contains all necessary instructions and procedural steps of the above-described status checkup operations. On starting a status checkup operation, data concerning the procedure of the checkup operation are read out from ROM 22 and put in RAM 23. Necessary data which come out as a result of a status checkup operation are also stored in RAM 23. Respective parts of the controller 11 are operated under control of CPU 23.

Figure 3:
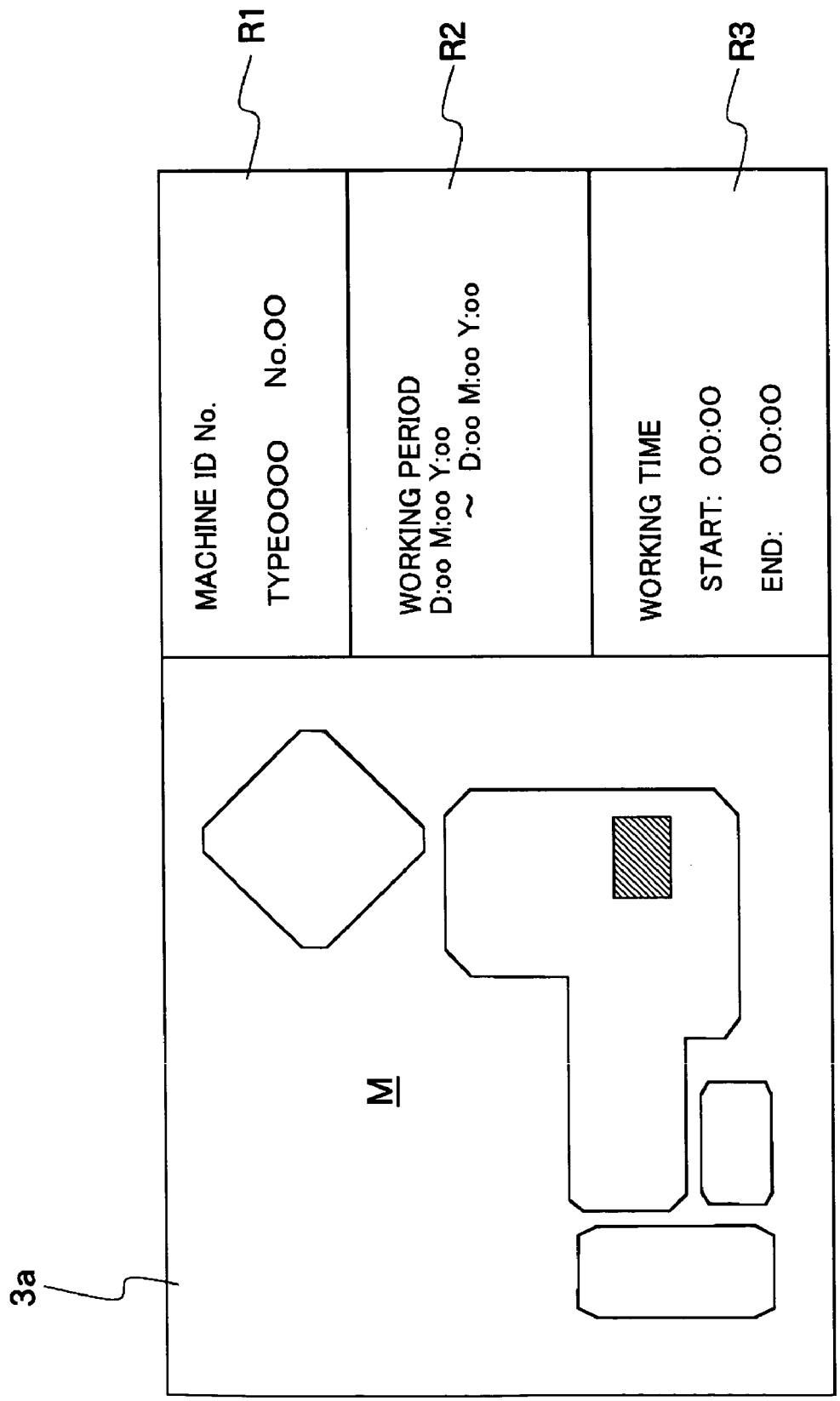
FIG. 3 is a diagrammatic illustration showing a first setup format for setting up working conditions of a construction machine.

For management of construction machines 2, it is necessary in the first place to set up a working area and a working time zone for each construction machine 2. These working conditions are set up by the management server 3. For example, as shown in FIG. 3, a working condition setup format is put on a display screen 3a of the management server 3, including a "MACHINE ID INPUT" box R1, a "WORKING PERIOD INPUT" box R2, a "WORKING TIME ZONE INPUT" box R3 and a "MAP" box M to be used in setting up a working area. More particularly, by the use of the input means 12 such as keyboard and mouse of the management server 3, the type and ID number of the construction machine to be put under management surveillance are entered in the "MACHINE ID INPUT" box R1, followed by entering of a working period in the "WORKING PERIOD INPUT" box R2.

Next comes the setup of a working area of the construction machines 2. In the particular embodiment shown, arrangements are made to select a working area by way of a relatively large unit of administrative division such as a state, prefecture county or the like. In this instance, a working area is selected by clicking a corresponding part of the map M. If necessary, the working conditions setup format may be arranged in such a way as to permit selection of a working area or a plural number of working areas by way of a smaller administrative division unit or units such as a city, a village and an urban, suburban or rural district. In this connection, it is also possible to set up a working area which is defined by latitudes and longitudes. Then, a working time zone of the construction machine 2 is set up by the "WORKING TIME ZONE SETUP" box R3. Namely, for setting a working time zone, a starting time and an ending time are entered in the "WORKING TIME ZONE SETUP" box R3.

The above-described working conditions of the construction machine 2 can be set up before taking the machine out of a garage. If desired, setup and alteration of working conditions of a machine can be made even after delivery to a working site 6. In relation with setup working conditions, respective construction machines are put under surveillance by the management server 3. Data of setup working conditions are transmitted to a corresponding construction machine 2 and stored in the working area storage portion 13a and the working time zone storage portion 13b of the memory means 13, respectively.

Figure 4:
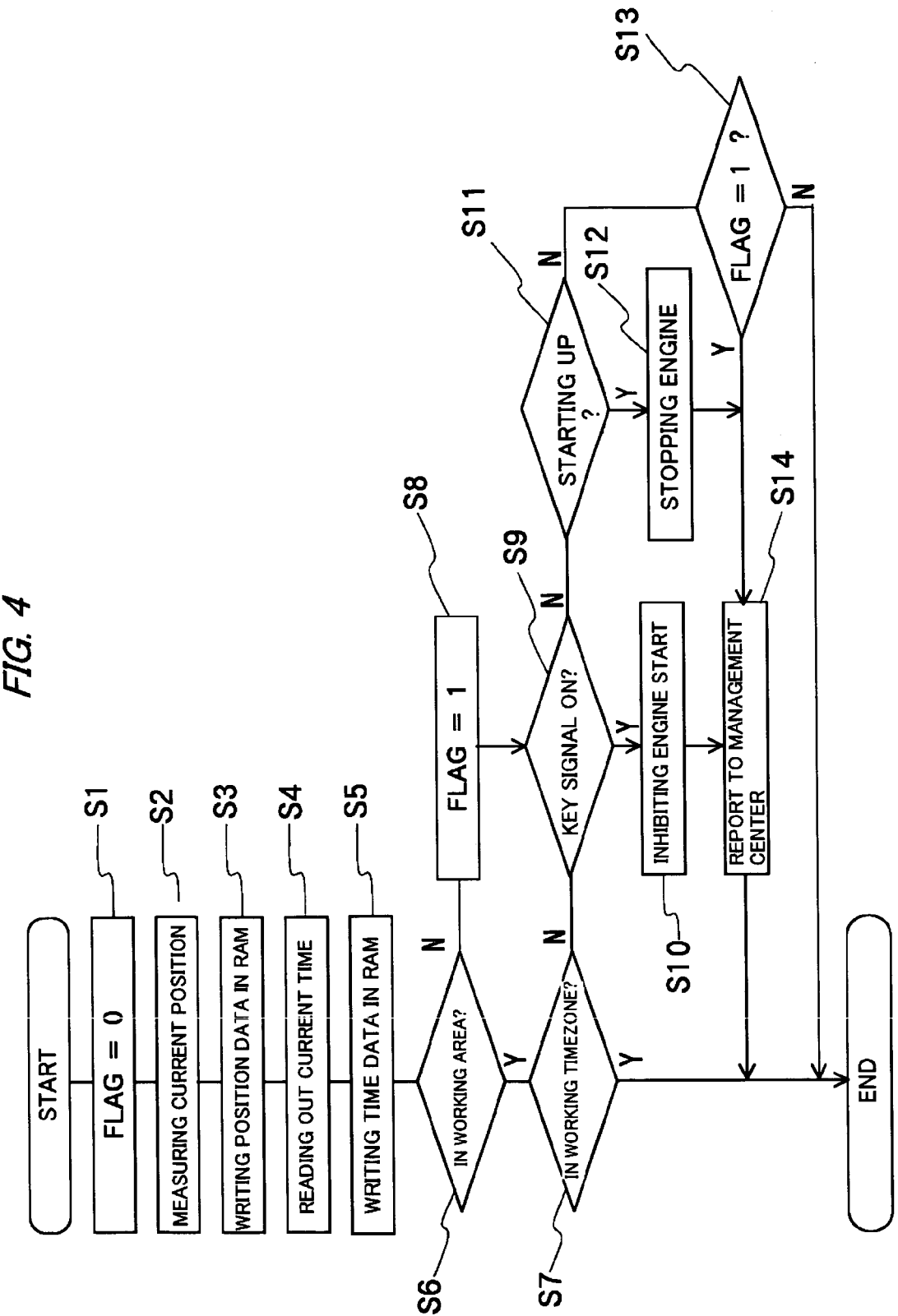
FIG. 4 is a flowchart of a checkup operation to be executed for checking up the current status of a construction machine on the basis of working conditions set up by the first setup format of FIG. 3.

For each construction machine, a status checkup operation is executed regularly at predetermined time intervals to check if the current status of the machine is in agreement with preset working conditions, that is to say, to see if the construction machine is in a normal state which is congruent with preset working conditions or in an abnormal state which is incongruent with preset working condition, with possibilities of a machine theft. In addition to the regular status checkups, a status checkup operation is also carried out as an on-start checkup every time the construction machine is started. The procedure of the status checkup operation is explained below step by step with reference to the flowchart of FIG. 4.

On starting a status checkup operation, a start index FLAG is set at "0" (Step 1), and the current position of the construction machine 2 is determined at the position data processing circuit 14 on the basis of GPS data received from the satellites 9 (Step 2), writing data of the current position of the construction machine 2 in RAM 23 (Step 3). Then, the current time is read out from the clock circuit 17 (Step 4), followed by writing of the current clock reading in RAM 23 (Step 5).

In the next place, data of the working area of the construction machine 2 are read out from the working area storage portion 13a of the memory means 13 and compared with data of the current position of the construction machine 2 to check whether or not the construction machine 2 is located in the preset proper working area (Step 6). If the construction machine 2 is judged as being located within the proper working area, the working time zone of the machine 2 is read out from the working time zone storage portion 13b and compared with the current time or current clock reading to check whether or not the construction machine 2 is in the preset working time zone (Step 7). In case the construction machine 2 is judged as being in the preset working time zone, the checkup operation is completed at this point.

On the other hand, in case the construction machine 2 is judged as being located outside the proper working area at Step 6, "1" is. substituted into FLAG (Step 8), and the operation proceeds to Step 9 to go to a next procedure. In case the construction machine is judged as being outside the preset working time zone in Step 7, the operation also proceeds to Step 9. At Step 9, a check is made as to whether or not the construction machine 2 is in the process of engine start outside the preset working area or outside the preset working time zone, namely, a check is made as to whether or not the engine key switch is turned on. If the engine key signal is on, the operation goes to the next Step 10 to take a countermeasure which inhibits an engine start. More specifically, an inhibition signal is applied to a starter motor 20 from the operation inhibiting signal output circuit 21 thereby to lock the operation of the starter motor 20. In case the engine key signal is turned out to be off at Step 9, the operation goes to Step 11 to check whether or not the engine is in operation. If the engine is turned out to be in operation at Step 11, the operation goes to Step 12 to take a measure for stopping the engine.

In case the engine of the construction machine is judged as being not in operation at Step 11, the operation goes to Step 13 to check whether or not FLAG is "1", that is to say, whether or not the current position of the construction machine 2 is outside the preset working area. In case FLAG is judged as being "1" at Step 13, or after taking a countermeasure to inhibit engine start at Step 10 or after taking a countermeasure to stop the engine at Step 12, data of the current position of the construction machine 2 and the current clock reading are reported to the management center through the data communication device 8.

As described above, the status checkup operation checks for not only whether or not the construction machine is located outside a preset working area but also whether or not the construction machine is put in operation outside a preset working time zone, inhibiting the operation of the machine as soon as machine is found to be in operation outside the preset working time zone even if it is located in the preset proper working zone. This sort of status check is extremely effective in preventing machine thefts especially in rest periods at night when no one is stationed at a working site 6 and a machine theft takes place at a high frequency.

Figure 5:
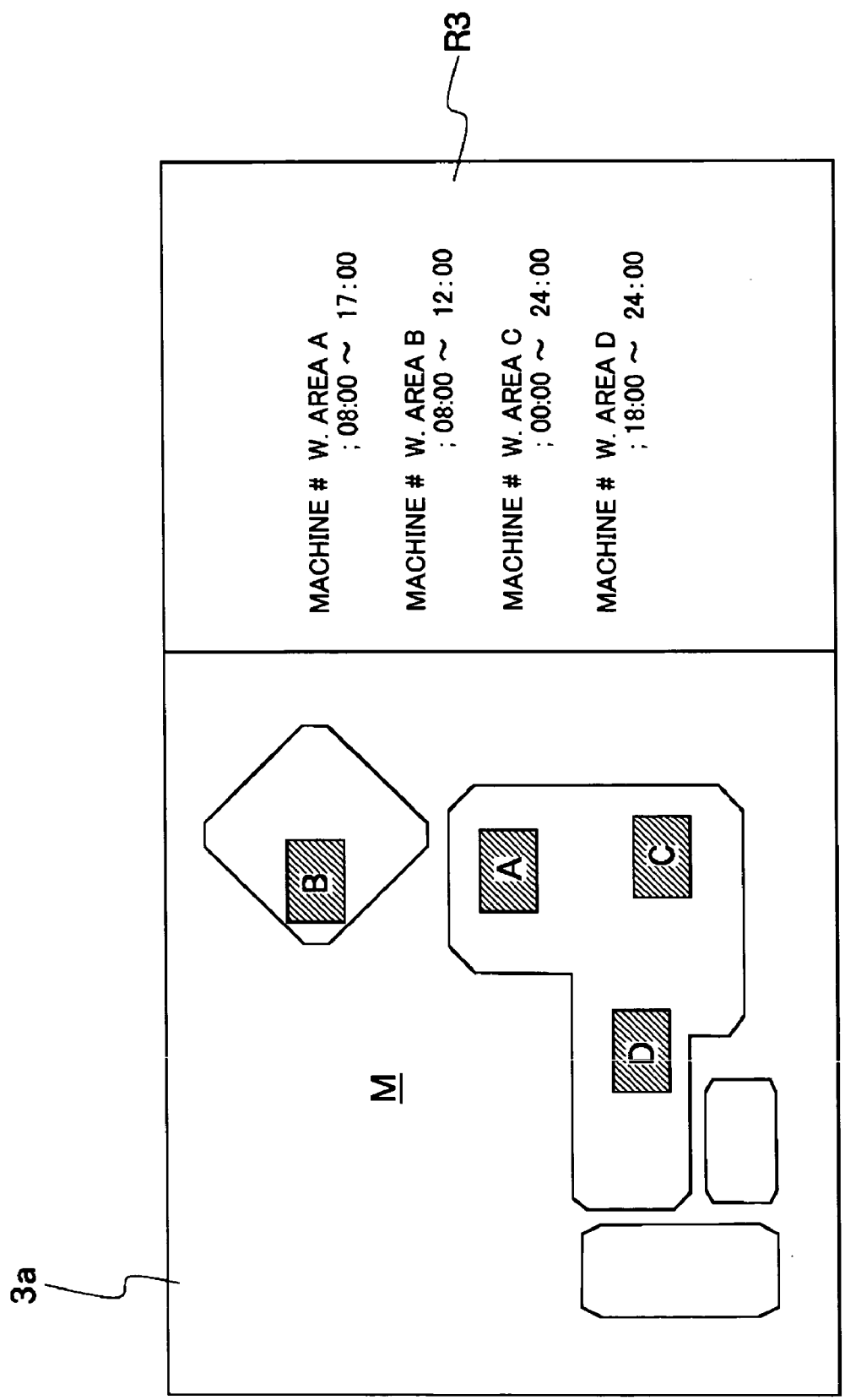
FIG. 5 is diagrammatic illustration showing a second or another setup format for setting up working conditions of a construction machine.

In setting up the above-described working conditions including the working area and the working time zone, it is possible to set up working conditions of a plural number of construction machines on one setup format. More particularly, a multiple setup format may be put on the display screen 3a of the management server 3 as shown in FIG. 5. In this case, the setup format is arranged to enter a plural number of working time zones in a "WORKING TIME ZONE SETUP" box R3 in combination with working areas selected on a map M. Accordingly, in a case where a region A is selected and set up as a working area on the map M, a working time zone in that working area A is entered at a first input position in the "WORKING TIME ZONE SETUP" box R3 to set up a working condition A. Next, a region B is selected and set up as a working area on the map M, and a working time zone in the working area B is entered in a second input position in the "WORKING TIME ZONE SETUP" box R3 to set up a second working condition B. Similarly, working condition C and working condition D are successively set up on the same setup format. In this case, an N-number of working conditions can be set up collectively on one setup format, and data of an N-number of working area are stored in the memory means 13 along with data of respective working time zones. In this instance, it is possible to set up a plural number of working conditions for one construction machine or to set up a plural number of working conditions for a plural number of construction machines. For example, it is possible to set up the same working conditions for all of construction machines, by not specifying machine ID numbers of the machines on the setup format.

Figure 6:
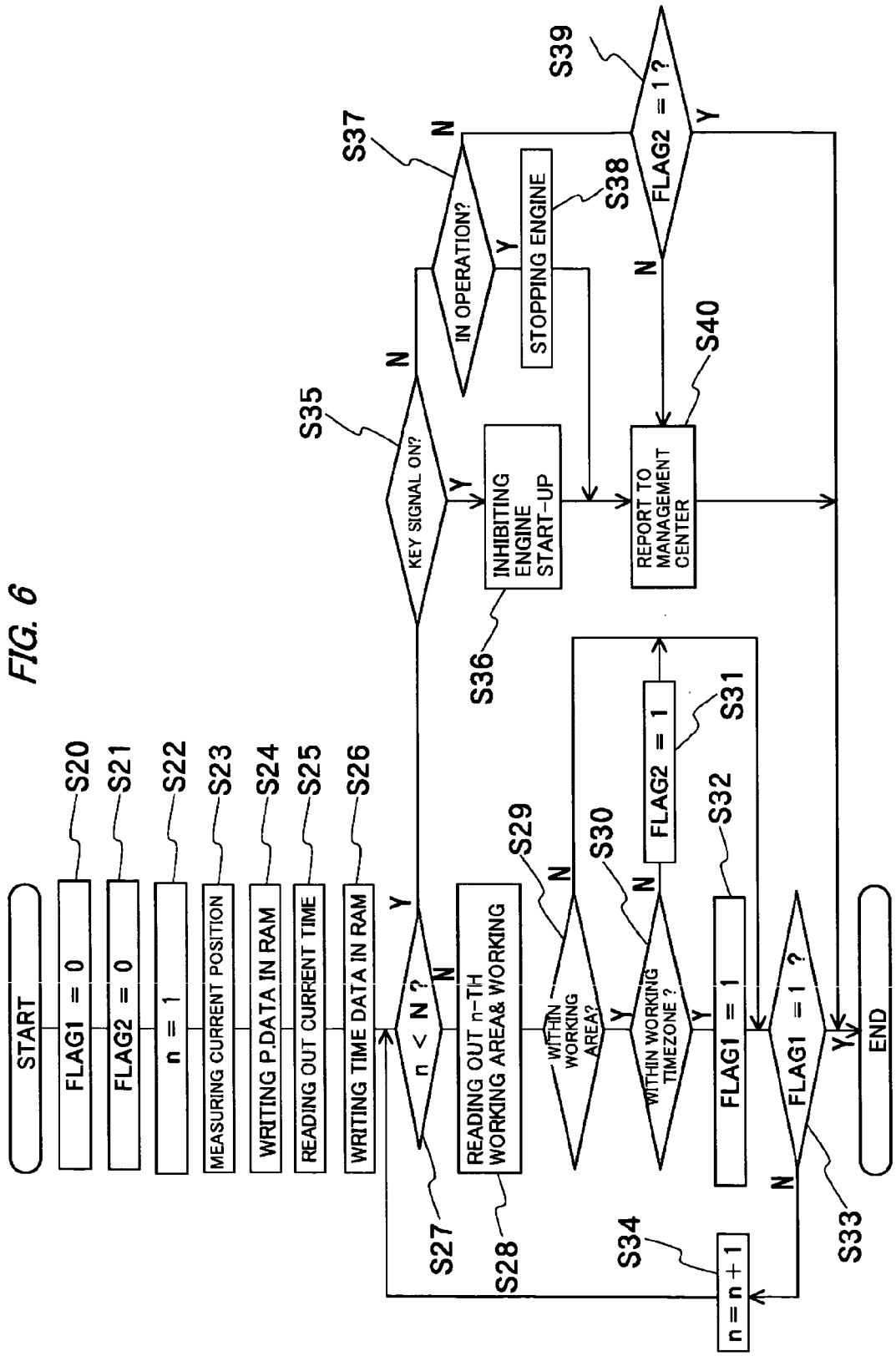
FIG. 6 is a flowchart of a checkup operation to be executed for checking up working conditions of construction machines on the basis of working conditions set up by the use of the second setup format.

In case an N-number of working conditions have been set up in the order of A, B, C, . . . N as described above, a status checkup operation is repeated for N-number of times and in that order. Accordingly, status checkup operations are carried out through the procedural steps as shown in the flowchart of FIG. 6.

Firstly, upon starting a status checkup operation, start index FLAG1 and FLAG2 are set at "0" (Steps 20 & 21), and a checkup repetition number n is set at 1 (Step 22). In the next place, the current position of the construction machine 2 is determined on the basis of position data from GPS satellites (Step 23). Data of the determined current position of the construction machine 2 are written into RAM 23 (Step 24). Current time is read out from the clock circuit (Step 25), and the data of the current time reading are written into RAM 23 (Step 26). These steps 23 to 26 are same as Steps 2 to 5 in the flowchart of FIG. 4.

After acquiring the current position and the current time, the checkup repetition number n is compared with a preset number N (Step 27). If n<N, (n) working area and (n) working time zone are read out from the memory means 13 (Step 28), checking whether or not the current position of the construction machine 2 is within the n-th working area (Step 29). In case the construction machine 2 is judged as being within the proper working area, the operation goes to a next step to check whether or not the current time is within the (n) working time zone (Step 30). In case the construction machine 2 is judged as being located within a proper working area and within a proper working time zone, "1" is substituted into FLAG1 and the operation goes to Step 33 no matter whether the construction machine 2 is at rest or in operation. In case the construction machine is judged as being located outside a preset working area, the operation goes straight to Step 33. In case the construction machine 2 is not in a preset working time zone, "1" is substituted into FLAG2 at Step 31 and the operation proceeds to Step 33. At Step 33 the state of FLAG1 is checked for, and, if FLAG1 is in the state of "0", 1 is added to n (Step 34) before repeating the checkup operation on the next working condition. Namely, Steps 27 to 33 are repeated to check whether or not the current position of the construction machine 2 and current time are within the limits of the (n+1) working conditions.

If FLAG1 is judged as being "1" at Step 33, the status checkup operation is completed because the construction machine 2 is in a proper state in agreement with a plural number of preset working conditions.

On the other hand, if FLAG1 is still in the state of "0" even after repeating the status checkup operations for a preset number (N) of times, it means a failure in satisfying all of the preset working conditions, namely, there is a possibility of machine theft. Therefore, if the engine key is found to be on, a countermeasure is taken to inhibit start of the engine (Steps 36 & 36). If the engine is in operation, a countermeasure is taken to stop the engine (Steps 37 & 38). In case the starter key signal is off and the engine is at rest, FLAG2 is checked for its value (Step 39). Namely, in case FLAG2 is "1", the checkup operation is ended, judging that the construction machine is located within a preset proper working area past a preset working time zone and has not been moved out of the proper working area. On the other hand, FLAG2 is still in the state of "0", the machine 2 is judged as being not located in any of preset working areas possibly due to a machine theft. In this case, after taking a countermeasure to inhibit engine start or to stop the engine or as soon as FLAG2 is found to be not in the state of "1", the current position of the construction machine 2 is transmitted to the management server3 at the management center 1 to complete the status checkup operation.

POSSIBILITY OF INDUSTRIAL UTILIZATION

According to the present invention with the arrangements as described above, each one of construction machines are checked against preset working conditions which include working time conditions in addition to geographical areal conditions as checkup criteria, permitting to spot the location of a construction machine promptly in case of a machine theft or the like.

What is claimed is:

1. A construction machine management system, for managing construction machines in such a way as to permit operations of construction machines only under specified working conditions while inhibiting operations of said construction machines when not in agreement with said specified working conditions, said system comprising:
    working condition setup means adapted to set up working conditions for each one of said construction machines, said working conditions including a working time zone in addition to a geographical working area;
    a memory means for storing the working conditions set up by said working condition setup means;
    a status checkup means adapted to check for current status of each one of said construction machines against both of said geographical working area and working time zone specified by said setup working conditions at predetermined time intervals including rest time periods;
    an operation inhibiting means adapted to inhibit operation of a construction machines when in a state incongruent with said setup working conditions with regard to both of said working area and working time zone, while permitting operation of said construction machines when satisfying both of said working area and working time zone of said working conditions; and
    a communication means adapted to report said management center current position and time of a construction machine as soon as operation of said construction machine is inhibited by said operation inhibiting means.

2. A construction machine management system as defined in claim 1, wherein said working conditions setup means is adapted to set up said working area on the basis of latitudes and longitudes or on the basis of known geographical divisions, and said status checkup means is adapted to measure current position of a construction machine on the basis of position data acquired from GPS satellites.

3. A construction machine management system as defined in claim 1, wherein said working conditions setup means is provided on the side of a management device holding all of construction machines under surveillance and adapted to exchange data with respective construction machines through wireless communication means.

4. A construction machine management system as defined in claim 3, wherein said working conditions setup means is provided in a communication terminal connected to said management device through a communication network.

5. A construction machine management system as defined in claim 1, wherein said memory means and said status checkup means are provided on the side of construction machines.

6. A construction machine management system as defined in claim 1, wherein said working conditions setup means is arranged into a format permitting a plural number of working conditions for one construction machine, along with working time zones in respective setup working areas.

7. A construction machine management system as defined in claim 1, wherein said operation inhibiting means is adapted to inhibit operation of an engine or a hydraulic actuator of a construction machine.

8. A method of managing construction machines for permitting operations of construction machines only under specified working conditions while inhibiting operations of said construction machines when not in agreement with said specified working conditions, said method comprising the steps of:

setting up working conditions for each one of construction machines under surveillance, including a geographic working area and a working time zone for operation in said geographic working area;

checking for current location of each one of said construction machines and current time against setup geographic working area and working time zone every time when said construction machine is started, and regularly at predetermined time intervals including rest periods of said construction machine, to check whether or not status of said construction machine is in agreement with said working conditions with regard to both of said geographic working area and working time zone;

inhibiting operation of said construction machine when found incongruent with both of said working area and working time zone of setup working conditions, while permitting operation of said construction machine when satisfying both of said setup working conditions; and reporting a management center current position and current time of a construction machine as soon as operation of said construction machine is inhibited due to failure to satisfy both of said setup working conditions.

9. A method of managing construction machines as defined in claim 8, comprising the steps of:

setting up for each one of construction machines under surveillance working conditions including a plural number of geographic working areas and a working time zone for operation in each geographic working area;

checking for current location of said construction machines and current time against setup geographic working areas and working time zones in the respective geographic working areas; and permitting start-up of said construction machine only when said construction machine is located in one of the setup geographic working areas and within a working time zone for that particular geographic working area.

* * * * *